UNITED STATES PATENT OFFICE.

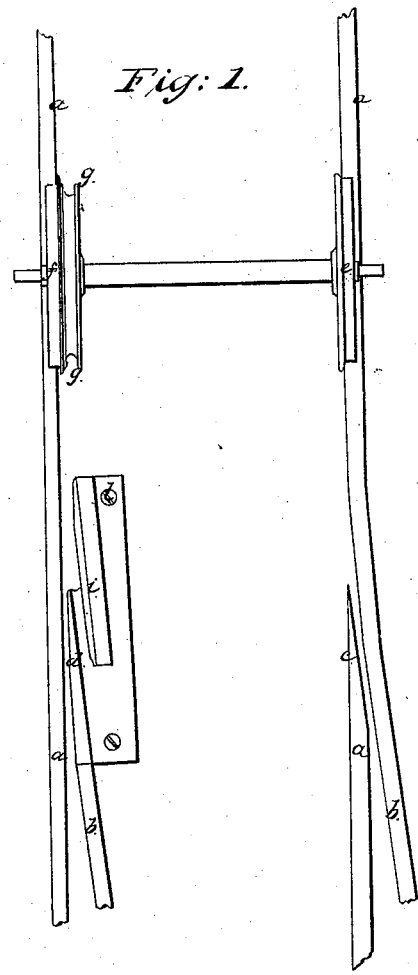

CONRAD B. LASHAR, OF NEW YORK, N. Y.

IMPROVEMENT IN RAILROAD-SWITCHES.

Specification forming part of Letters Patent No. 40,694, dated November 24, 1863; antedated November 9, 1863.

*To all whom it may concern:*

Be it known that I, CONRAD B. LASHAR, of the city and State of New York, have invented, made, and applied to use a certain new and useful Improvement in Switches for Railroad-Cars; and I do hereby declare the following to be a full, clear, and exact description of my said invention, reference being had to the annexed drawings, making a part of this specification, wherein—

Figure 1 is a plan of the track and of a pair of wheels; and Fig. 2 is a vertical section of the switch, with the wheels upon the track.

Similar marks of reference denote the same parts.

Railroad-cars have heretofore been switched from the main track upon a turnout, or the reverse, by means of a raised rail acting as an inclined plane to raise the car up and cause the thread of the wheels to pass over one line of track and take another line of track, and movable switches have also been employed to give direction to the wheel-flanges.

The nature of my said invention consists in a guide-wheel or flange applied to the car wheels or axles in such a manner as to take at the side of a stationary switch-rail and draw the wheels sidewise from one line of track upon another. The tracks themselves being of the ordinary construction, those cars that are not fitted with the guide-wheels, or with a different guide-wheel, proceed on the track as usual, while the car that is to turn off at a particular switch is directed across the frog-plate to the proper line of track by the said stationary switch-rail.

In the drawings, *a a* represent the rails of a railroad continuing along straight or nearly straight, while *b b* are the rails of the turnout-track. *c* and *d* are the tongues on the ordinary frog-plates that form the junction of the respective tracks. *e* and *f* are the wheels of the car or truck, which car or truck may be of any usual character, and if all the wheels were of the ordinary character—such as the wheels *e*—the car would pass unobstructed along the straight track *a*. The wheels of such cars as are to go off at the turnout are formed, as shown at *g*, with a second flange, taking against the side of the switch-rail *i*, that is formed to stand somewhat above the level of the rails *a* and *b*, in order that the flange *g* may be of less diameter than the wheel. This switch-rail *i* is to be placed as shown, so that the flange *g*, taking within the inner side thereof, shall draw the first pair of wheels bodily sidewise, and cause the flanges of the wheels to enter the turnout and take the track thereof. Both the wheels on one side may be made with these guide-flanges, or all the wheels of the car may be made in this manner, so as to act regardless of which end of the car may be going forward. It will be seen that this switch-rail *i* does not lift the car in the least, but only acts to give direction to the car from the main line to the turnout, and it may be at a greater or less distance from the track, or at a greater or less elevation, in order that the guide-flanges may be fitted on the wheels or axles in different positions, so that several lines of cars may run on one main railroad and be turned off by the switch-rail and guide-flanges on arriving at their proper turnout. The switch-plate carrying this rail *i* may be secured to the sleeper or to the frog-plate by a bolt at *l*, upon the loosening or removal of which the guide-rail may be moved back out of the way when it may become necessary to prevent the cars turning off at their usual turnouts.

What I claim, and desire to secure by Letters Patent, is—

The switch-rail *i*, fitted substantially as specified, in combination with the flange *g* on the car axle or wheel, to give direction to the car from the main track upon the turnout, as set forth.

In witness whereof I have hereunto set my signature this 24th day of April, 1863.

C. B. LASHAR.

Witnesses:
 LEMUEL W. SERRELL,
 CHAS. H. SMITH.